UNITED STATES PATENT OFFICE.

WILLIAM P. CLOTWORTHY, OF BALTIMORE, MARYLAND.

BAKING-POWDER.

SPECIFICATION forming part of Letters Patent No. 265,244, dated October 3, 1882.

Application filed May 31, 1882. (No specimens.)

*To all whom it may concern:*

Be it known that I, WILLIAM PITT CLOTWORTHY, a citizen of the United States, residing in the city of Baltimore, in the State of Maryland, have invented a new and useful Composition of Matter as a Baking-Powder to be Used in Bread-Making, of which composition the following is a specification.

My invention relates to that class of compounds commonly known as "leavening" or "baking" powders, as a substitute for yeast for culinary purposes; and it consists in a novel and valuable use of acetate of lime in eliminating carbonic acid from alkaline carbonates for such purposes. I consider this salt—acetate of lime—as being entirely free from the objection that may be urged against salts of alumina— namely, the danger of the alumina uniting with the phosphate of the flour, and thereby forming an insoluble phosphate of alumina, and to that extent destroying the nutritive properties of the flour.

It is well and generally known that lime is a valuable constituent element of all kinds of corn or grain of which bread is made, and, being readily dissolved in the gastric juice, it contributes directly to the strengthening of the bones. The acetate of lime, being permanent under climatic changes, and not absorbing moisture from the atmosphere, is, for that reason, valuable in the preparation of various baking preparations commonly known and described as "yeast" or "baking" powders.

In my invention I combine acetate of lime, bicarbonate of soda, (or its chemical equivalent,) and starch or flour, and in variable proportions, as circumstances may require; but for general culinary purposes I deem best, and therefore prefer in the compound, the proportions in weight as follows, viz: two (2) parts of acetate of lime, one (1) part of bicarbonate of soda, and one (1) part of powdered starch, two tea-spoonfuls of which compound are used to each quart or pound of flour.

What I claim, and desire to secure by Letters Patent of the United States, is—

As a baking-powder, a compound of acetate of lime, bicarbonate of soda, (or its chemical equivalent,) and starch or flour, substantially in the proportions and for the purpose specified.

WILLIAM PITT CLOTWORTHY.

Witnesses:
    HARRY C. MARTIN,
    WILLIAM V. LOGAN.